United States Patent Office 3,297,722
Patented Jan. 10, 1967

3,297,722
PREPARATION OF DICHLOROMALEIC ANHYDRIDE AND THE CATALYST USED THEREIN
Erwin A. Hoess, Wharton, N.J., assignor to FMC Corporation, New York, N.Y., a corporation of Delaware
No Drawing. Filed Mar. 6, 1963, Ser. No. 263,113
8 Claims. (Cl. 260—346.8)

This invention relates to an improved method of preparing dichloromaleic anhydride, and more particularly it relates to an improved catalyst for the preparation of dichloromaleic anhydride.

Dichloromaleic anhydride is an intermediate which is useful in the preparation of fungicides and flame-retardant polyesters. It is known that this compound can be produced by the catalytic chlorination of maleic anhydride in the presence of iron powder or ferric chloride as catalyst. However, this process results in the formation of substantial quantities of more highly chlorinated product, such as tetrachlorosuccinic anhydride, and the yield of dichloromaleic anhydride is consistently low, generally no higher than about 50%.

It is an object of this invention to provide a method of preparing dichloromaleic anhydride in high yield by the chlorination of maleic anhydride. Another object is to provide an improved catalyst for the chlorination of maleic anhydride to dichloromaleic anhydride. These and other objects will become apparent from the following description of this invention.

I have now discovered that high yields of dichloromaleic anhydride, generally about 80–90%, can be achieved by chlorinating maleic anhydride in the presence of an activated ferric chloride catalyst prepared by pre-reacting anhydrous ferric chloride and dichloromaleic anhydride prior to using the catalyst in the chlorination of maleic anhydride.

When chlorinating maleic anhydride using the activated catalyst described herein, the course of the reaction is directed toward the formation of dichloromaleic anhydride rather than to more highly chlorinated products. Reaction in the presence of activated ferric chloride is characterized by very high chlorine efficiency until, quite suddenly, the chlorine "breaks through" and is no longer efficiently consumed, after about 80% of the expected chlorine uptake has occurred. When ferric chloride which has not been activated is used in the chlorination, inefficient utilization of chlorine is experienced throughout the reaction and the product contains substantial quantities of material more highly chlorinated than dichloromaleic anhydride.

The activated catalyst of this invention is prepared by reacting anhydrous ferric chloride and dichloromaleic anhydride in the absence of a combination of free chlorine and maleic anhydride. In other words, the activated catalyst can be prepared in the presence of maleic anhydride or chlorine, but not both. For example, the catalyst can be prepared by reacting iron powder, chlorine and dichloromaleic anhydride, thereby converting the iron powder to ferric chloride, which then reacts with dichloromaleic anhydride to produce the novel catalyst taught herein. A preferred method of preparing the activated catalyst is to prereact ferric chloride and dichloromaleic anhydride in the presence of maleic anhydride. When the prereaction has been carried out for a sufficient time to activate the catalyst, the chlorination of maleic anhydride can be commenced by introducing chlorine to the reactor and maintaining the chlorination temperature.

The nature of the catalyst formed during the heating of the ferric chloride and dichloromaleic anhydride is unknown. However, observation of the mixture during the heat treatment shows that a reaction is taking place. When the mixture is first prepared, a light yellow precipitate forms which, on heating and stirring, slowly dissolves to give a yellow-brown solution, which progressively darkens in color to a redish-brown. These changes are accompanied by slow hydrogen chloride evolution.

The activated catalyst of this invention is prepared by reacting at least about 2 parts by weight of dichloromaleic anhydride with each part of anhydrous ferric chloride. Since the ferric chloride reacts with dichloromaleic anhydride in all proportions there is no upper limit on the amount of dichloromaleic anhydride used. For best results, however, no more than about 12 parts of dichloromaleic anhydride per part of ferric chloride should be used, since no benefit is derived from the use of larger amounts and their presence unnecessarily increases the amount of material recycled. When less than about 2 parts of dichloromaleic anhydride per part of ferric chloride are present, the catalyst is substantially reduced in activity. Preferably, the catalyst should be prepared with about 3–8 parts of dichloromaleic anhydride per part of ferric chloride.

The reaction between ferric chloride and dichloromaleic anhydride takes place at temperatures between the temperature at which the dichloromaleic anhydride is molten and about 225° C. The minimum temperature will depend upon the melting temperature of the dichloromaleic anhydride, which of course will in turn depend upon the purity of the dichloromaleic anhydride. The activated catalyst can be prepared from crude, unrefined dichloromaleic anhydride product prepared by the chlorination of maleic anhydride, partially refined dichloromaleic anhydride, or pure dichloromaleic anhydride. Accordingly, when a crude dichloromaleic anhydride is used the reaction temperature may be as low as about 90° C. For best results, the temperature should be about 100–200° C., and preferably about 110–140° C.

The length of time that the ferric chloride and dichloromaleic anhydride should be prereacted will vary depending upon the temperature. The reaction should be continued until the evolution of hydrogen chloride has ceased, at which point the reaction product will have a reddish-brown color. The reaction can of course be terminated before the reaction is completed, with a corresponding decrease in the activity of the catalyst. Generally, the reaction will take at least about 2 hours for completion. Continued heating after completion of the reaction has no detrimental effect.

Since maleic anhydride does not react with ferric chloride in the absence of chlorine, it is preferable to activate the catalyst in the presence of maleic anhydride, thus preheating the maleic anhydride before chlorination. When the ferric chloride-dichloromaleic anhydride reaction product has been formed, the temperature is adjusted to the desired chlorination temperature and chlorine is introduced, thus initiating the chlorination reaction.

The chlorination of maleic anhydride using the activated catalyst taught herein is carried out under the same conditions as those previously employed using conventional chlorination catalysts. The reaction should be carried out in the presence of about 0.5–5% by weight of activated ferric chloride catalyst, basing the ferric chloride content of the catalyst on the maleic anhydride present, and preferably about 1–3%. The reaction is conveniently carried out under reflux of the medium at temperatures of about 160–225° C., and preferably about 170–200° C. Atmospheric pressure is generally employed although higher or lower pressure may be used to control the desired reflux temperature. Chlorine is preferably added at about the rate at which it is consumed, although greater or lesser amounts can be used, if desired. The reaction time will vary over wide limits depending upon the reaction temperature and the rate of chlorine addition. Generally, the reaction time will be from about 2-20 hours.

Hydrogen chloride is evolved during the chlorination reaction and is continually removed from the reactor. Chlorination is continued until the concentration of chlorine gas in the exit gas stream increases markedly. At this point, chlorination can be stopped. This end point is readily determined by analyzing the exit gas using conventional techniques. It may be desirable to continue the chlorination beyond this point, since the product will contain some monochloromaleic anhydride. In this case the chlorine feed rate should be decreased to about one-fourth its previous level and chlorination can be continued until essentially no further chlorine is consumed.

The following reactions are believed to occur during the chlorination of maleic anhydride:

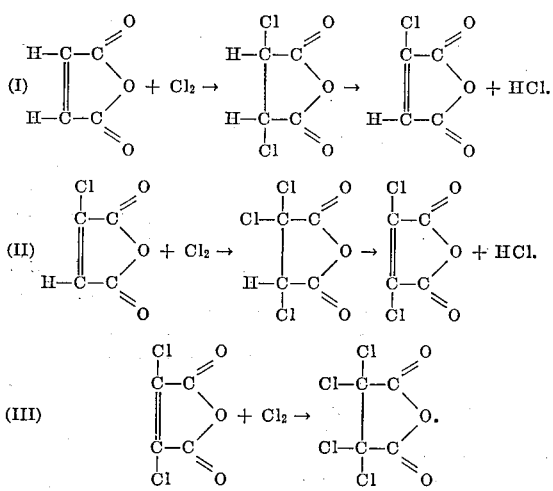

When conventional ferric chloride is employed in the chlorination of maleic anhydride, Reaction III will occur to a large extent, thus preventing a high yield of dichloromaleic anhydride. When the chlorination is carried out in the presence of the activated ferric chloride catalyst of this invention, the course of the chlorination proceeds at an accelerated rate through Reaction II, but without the formation of any substantial amount of higher chlorinated material as in Reaction III. When the chlorination is carried out in the presence of ferric chloride and dichloromaleic anhydride, but without prereaction of them to form the activated catalyst of this invention, Reactions II and III are both suppressed, apparently due to the law of mass action.

At the completion of the chlorination reaction further amounts of hydrogen chloride gas, resulting from the dehydrochlorination of trichlorosuccinic anhydride, should be removed from the reaction mass. This can be accomplished by passing an inert gas, such as nitrogen, through the reactor. To aid in this removal, the reaction mass is preferably heated to reflux. While simply heating the nitrogen-purged product under reflux is sufficient to remove most of the hydrogen chloride, this method is tedious on a large scale, and may be facilitated by the addition of a small quantity, such as about 2%, of barium chloride, if desired.

Refining the product may be accomplished by distilling the reaction mass. The distillation can be carried out at atmospheric pressure, in which case the product is take overhead at a temperature of about 185-200° C. Since the product obtained by distillation is contaminated with ferric chloride, which codistills, it is preferred to treat the crude dichloromaleic anhydride product with sufficient anhydrous alkali metal ferrocyanide to convert the ferric chloride to ferriferrocyanide (Prussian blue) before distillation.

Unfortunately, dichloromaleic anhydride cannot be separated from by-products such as monochloromaleic anhydride and trichlorosuccinic anhydride by distillation. Monochloromaleic anhydride boils at 196° C., and thus tends to concentrate in the last overhead fraction, while trichlorosuccinic anhydride, when present, concentrates in the forecut. After the crude dichloromaleic anhydride mixture has been recovered from the reaction mass by distillation, it may be separated from any by-products by dissolving the mixture in about twice its volume of warm carbon tetrachloride and cooling to about 5° C. to induce crystallization of substantially pure dichloromaleic anhydride. Further washings with carbon tetrachloride may be used, if desired, to remove any trace impurities.

The following examples illustrating the improved process and novel catalyst disclosed herein, are presented without any intention that the invention be limited thereto. All percentages are by weight.

*Example I*

An activated ferric chloride catalyst was prepared as follows: A 2-liter creased flask, equipped with a steam-cooled reflux condenser, was charged with 980 g. of maleic anhydride, 20 g. of anyhdrous ferric chloride, and 100 g. of crude dichloromaleic anhydride. The mixture was stirred and heated to 120° C. The light yellow precipitate, which formed at first, soon dissolved, and the solution gradually changed from yellow-brown to dark reddish-brown. The heating was continued for 12 hrs. during which time hydrogen chloride was evolved.

(A) Dichloromaleic anhydride was prepared using the activated catalyst as follows: The above product mixture was heated to 180° C., and chlorine was introduced from a weighted cylinder through a rotameter at about 320 g./hr. The off-gas was sampled every 30 min. and analyzed for chlorine and hydrogen chloride. After 5 hrs., the rate of chlorine absorption suddenly decreased. This was evidenced by the characteristic green color of chlorine in the off-gas and by an increase in the heat input required to maintain the reaction temperature at 180–190° C. At this point, 1600 g. of chlorine had been fed to the reactor. The chlorine feed rate was reduced to 90 g./hr. and the reaction was continued for another 5 hrs. at the end of which time chlorine absorption had practically ceased. The total chlorine input for the 10-hr. period was about 2070 g. The reaction product was treated with 20 g. of barium chloride and heated at 190–195° C. for 3 hrs. while a slow stream of nitrogen was introduced through the chlorine inlet tube to sweep out hydrogen chloride. The temperature was decreased to 120° C., and 56 g. of anhydrous potassium ferrocyanide was added. After holding the mixture at 120° C. for an hour, the reflux condenser was replaced with a Vigreaux distillation column, the temperature was raised to the boiling point, and the product was taken overhead at 190° to 196° C. in three fractions. To determine the dichloromaleic anhydride content of each fraction, the fractions were each dissolved in twice their volume of warm carbon tetrachloride and the solution was cooled to 5° C. The solids were collected and washed with further amounts of cold carbon tetrachloride and then dried. The following analysis of the three fractions was obtained:

| Distillate Fraction | Weight, grams | Percent Chlorine | Melting Point, ° C. | Percent Crystallized |
|---|---|---|---|---|
| I | 43 | 45.8 | 107-109 | 77 |
| II | 832 | 44.2 | 118-119 | 84 |
| III | 732 | 42.5 | 119-122 | 91 |
| Residue | 62 | | | |

The crystallization results indicate a yield of about 84%. Fraction III is substantially pure dichloromaleic anhydride which contains 42.5% chlorine and melts at 119° C.

(B) For comparison, dichloromaleic anhydride was prepared using a conventional ferric chloride catalyst, not in accordance with this invention, as follows: Eight grams of anhydrous ferric chloride was added to a reaction flask containing 392 g. of maleic anhydride and the mixture was heated to 180° C. and chlorine was introduced at the rate of 108 g./hr. for about 5.5 hrs., after which a total of 591 g. of chlorine had been added. The reaction product was treated with barium chloride and distilled as in the above example. The distillation fractions were analyzed and crystallized from carbon tetrachloride to give the following results:

| Distillate Fraction | Weight, grams | Percent Chlorine | Melting Point, °C. | Percent Crystallized |
|---|---|---|---|---|
| I | 228 | 47.0 | 92 | 39 |
| II | 328 | 46.2 | 70 | 46 |
| III | 89 | 42.8 | 50-108 | 44 |
| Residue | 29 | | | |

The yield of dichloromaleic anhydride was 42%.

(C) In order to show the criticality of prereacting the ferric chloride and dichloromaleic anhydride before the chlorination reaction begins, the following example was carried out: To a reaction flask were added 2942 g. of maleic anhydride, 294 g. of dichloromaleic anyhdride and 59 g. of ferric chloride. The mixture was heated to 185° C. and chlorine was immediately introduced at a rate of 515 g./hr. for about 8.25 hrs., after which a total of 4260 g. of chlorine had been added. The reaction product was treated with barium chloride, distilled, and crystallized from carbon tetrachloride as before to give the following results:

| Distillate Fraction | Percent Chlorine | Melting Point, °C. | Percent Crystallized |
|---|---|---|---|
| I | 30.9 | 90-95 | 69 |
| II | 31.2 | 84-99 | 52 |
| III | 30.9 | 50-80 | 7 |

The yield of dichloromaleic anhydride was about 53%.

*Example II*

Dichloromaleic anhydride was prepared using an activated ferric chloride catalyst containing 2.5 parts of dichloromaleic anhydride per part of ferric chloride as follows: A flask was charged with 980 g. of maleic anhydride, 20 g. of anhydrous ferric chloride, and 49 g. of crude dichloromaleic anhydride. The mixture was stirred and heated at 120° C. for 8 hrs., during which time hydrogen chloride was evolved. After the prereaction of the ferric chloride and dichloromaleic anhydride, the mixture was heated to 180° C. and chlorine was introduced at the rate of 309 g./hr. for about 5.25 hrs., for a total chlorine charge of 1615 g. The reaction product was treated with barium chloride, distilled, and crystallized from carbon tetrachloride as in the previous examples. The yield of dichloromaleic anhydride was 68%.

*Example III*

Dichloromaleic anhydride was prepared using an activated ferric chloride catalyst containing 10 parts of dichloromaleic anhydride per part of ferric chloride as follows: A flask was charged with 2940 g. of maleic anhydride, 59 g. of anhydrous ferric chloride and 588 g. of crude dichloromaleic anhydride. The mixture was stirred and heated at 120° C. for 8 hrs., during which time hydrogen chloride was evolved. After the prereaction of the ferric chloride and dichloromaleic anhydride, the mixture was heated to 183° C. and 4360 g. of chlorine was introduced at the rate of 545 g./hr. for about 8 hrs., after which the rate of chlorination suddenly decreased. The chlorine rate was decreased to 106 g./hr. and an additional 637 g. of chlorine was introduced over a 6-hr. period. The reaction product was treated with barium chloride, distilled, and crystallized from carbon tetrachloride as in the previous examples. The yield of dichloromaleic anhydride was 85%.

*Example IV*

Dichloromaleic anhydride was prepared using an activated ferric chloride catalyst made by reacting iron powder, chlorine and dichloromaleic anhydride as follows: A suspension of 28 g. of hydrogen-reduced iron powder in 417 g. of pure dichloromaleic anhydride was heated under reflux (190-195° C.) with good agitation, while chlorine was introduced at the rate of 50 g./hr. for 3 hrs. To this catalyst was added 8350 g. of maleic anhydride and the chlorination was carried out following the procedure of Example I(A). The reaction product was treated with barium chloride, distilled, and crystallized from carbon tetrachloride as in the previous examples. The yield of dichloromaleic anhydride was 85%.

As will become apparent to those skilled in the art, numerous modifications and variation of the embodiments illustrated above may be made without departing from the spirit of the invention or the scope of the following claims.

I claim:

1. An improved method for preparing dichloromaleic anyhdride which comprises chlorinating maleic anhydride in the presence of a catalyst resulting from prereacting at least 2 parts by weight of dichloromaleic anhydride with each part of anhydrous ferric chloride if desired in the presence of either maleic anhydride or chlorine but not in the presence of both, at a temperature between the temperature at which the dichloromaleic anhydride is molten and 225° C.

2. The improved method of claim 1 in which the catalyst results from prereacting 2-12 parts by weight of dichloromaleic anhydride with each part of anhydrous ferric chloride at a temperature of 100-200° C.

3. An improved method for preparing dichloromaleic anhydride which comprises chlorinating maleic anhydride in the presence of a catalyst resulting from prereacting 2-12 parts by weight of dichloromaleic anhydride with each part of ferric chloride if dseired in the presence of either maleic anhydride or chlorine but not in the presence of both, at a temperature in the range of 100-200° C., said catalyst being present in an amount of 0.5-5% by weight, based on the amount of ferric chloride prereacted, relative to the said maleic anhydride.

4. The improved method of claim 2 in which the activated ferric chloride catalyst is prepared in the presence of maleic anhydride.

5. An improved method for preparing dichloromaleic anhydride which comprises mixing maleic anhydride with 1-3% by weight of anhydrous ferric chloride and 3-8 parts by weight of dichloromaleic anhydride per part of ferric chloride, heating the mixture to a temperature in the range of 110-140° C. in the absence of chlorine, thereby causing the ferric chloride and dichloromaleic anhydride to react, chlorinating the resulting mixture at a temperature of 170-200° C., and recvovering dichloromaleic anhydride as a product of the process.

6. A catalyst for preparing dichloromlaeic anhydride by the chlorination of maleic anhydride comprising the reaction product produced by reacting at least 2 parts of dichloromaleic anhydride with each part of ferric chloride if desired in the presence of maleic anhydride or chlorine but not in the presence of both, at a temperature between the temperature at which the dichloromaleic anhydride is molten and 225° C.

7. The catalyst of claim 6 in which 2-12 parts by weight of dichloromaleic anhydride are reacted with each part of anhydrous ferric chloride at a temperature of 100–200° C.

8. The catalyst of claim 6 in which 3–8 parts by weight of dichloromaleic anhydride are reacted with each part of anhydrous ferric chloride at a temperature of 110–140° C.

References Cited by the Examiner
UNITED STATES PATENTS

| | | | |
|---|---|---|---|
| 2,391,261 | 12/1945 | Milone | 260—346.8 |
| 2,425,509 | 8/1947 | Clifford et al. | 260—346.8 |
| 2,432,470 | 12/1947 | Clifford et al. | 260—346.8 |

OTHER REFERENCES

Baskakov et al., Chem. Abst., vol. 49 (1955), col. 12484 (abstract of Zhur. Obshchei Khim., 24 (1954) pp. 1216–21).

Eldred et al., J. Amer. Chem. Soc., vol. 75 (1953), pages 4338–9.

ALEX MAZEL, *Primary Examiner.*

HENRY R. JILES, *Examiner.*

N. S. RIZZO, J. H. TURNIPSEED,
*Assistant Examiners.*